United States Patent [19]

Shigemori

[11] Patent Number: 5,063,552
[45] Date of Patent: Nov. 5, 1991

[54] OPTICAL DISK APPARATUS WITH DATA TRANSFER RATE AND ROTATIONAL SPEED VARIABLE BY ANNULAR ZONES

[75] Inventor: Toshihiro Shigemori, Yokohama, Japan

[73] Assignee: Ricoh Company, Ltd., Tokyo, Japan

[21] Appl. No.: 375,573

[22] Filed: Jul. 5, 1989

[30] Foreign Application Priority Data

Jul. 6, 1988 [JP]  Japan ................................. 63-168135

[51] Int. Cl.⁵ ............................................... G11B 7/00
[52] U.S. Cl. ...................................... 369/50; 369/133; 369/240
[58] Field of Search ................... 369/32, 240, 133, 50, 369/59; 360/73.03; 358/342

[56]  References Cited

U.S. PATENT DOCUMENTS

| 4,514,771 | 4/1985 | Stark et al. | 360/73.03 |
| 4,530,018 | 7/1985 | Hoshino | 360/72.2 |
| 4,750,059 | 6/1988 | Syracuse | 369/50 X |
| 4,780,866 | 10/1988 | Syracuse | 369/59 |

Primary Examiner—Robert L. Richardson
Attorney, Agent or Firm—Cooper & Dunham

[57] ABSTRACT

A control system is provided for an optical disk driving apparatus adapted to rotate an optical disk having a plurality of tracks, and which is adapted, during the rotation of the disk, to perform optical recording and/or reproduction of information for a track which has been accessed with a light beam. The control system changes the speed f of recording/reproduction of information in accordance with the radius r of a track to be accessed in such a manner that the tracks are divided into a plurality of concentric annular blocks each having different approximate radii, and the same speed f of the recording/reproduction of information is allocated to the tracks in the same block but different speeds f of recording and/or reproduction of information are allocated to the respective blocks. The controlling system changes the speed n of rotation of the optical disk with respect to the radius r of the track to be accessed and the speed f of record/reproduction of information allocated to the block including the track to be accessed so that f/(n·r) is constant.

16 Claims, 3 Drawing Sheets

OPTICAL DISK APPARATUS WITH DATA TRANSFER RATE AND ROTATIONAL SPEED VARIABLE BY ANNULAR ZONES

BACKGROUND OF THE INVENTION

The present invention relates generally to an optical disk driving apparatus. More particularly, the invention relates to a control system for an optical disk driving apparatus which is adapted to rotate an optical disk having a plurality of tracks, and which is adapted, during the rotation of the disk, to perform optical recording and/or reproduction of information for a track which has been accessed by a light beam impinging. It is to be noted that, in the present invention, the term "optical disk" means various kinds of optical disks such as, for example, a read-only optical disk, or a rewritable or erasable magneto-optical disk.

There are two known kinds of control systems, for defining the relationship between the rotation of an optical disk and the recording format of information on the optical disk. One is a constant angular velocity (CAV) type and the other is a constant linear velocity (CLV) type.

In an optical disk driving apparatus using a CAV system, when optical recording and/or reproduction of information for an optical disk is performed, the optical disk is rotated at a constant angular velocity. That is, the number of revolutions per unit time (i.e., rotation speed) of the optical disk is maintained constant, without relation to the radius of the tracks formed on the optical disk. Therefore, when the rate of recording and/or reproduction of information is also maintained constant, the information recording density on a given track is different from that on the other tracks, due to different linear velocities on the respective tracks, resulting in a decrease of the recording capacity of the optical disk.

On the other hand, in an optical disk driving apparatus using a CLV system, when optical record and/or reproduction of information for an optical disk is performed through an optical pickup, the rotation speed of the optical disk is varied in relation to the radii of tracks formed on the optical disk so that a constant linear velocity of the optical disk with respect to the optical pickup can be obtained on all the tracks.

It is known that when the speed of recording/reproduction of information for the optical disk is given as f (bit/sec); the radius of a track to be accessed to record and/or reproduce information is given as r (mm); and the speed of rotation of the optical disk is given as n (rps), then the information recording density b (bit/mm) on the track of the optical disk is represented by the following equation.

$$b = f/(2\pi \cdot n \cdot r) \quad (1)$$

In an optical disk driving system using a CLV system, in order to obtain a constant information recording density b on all the tracks of the optical disk, the rotation speed n of the optical disk is changed in inverse proportion to the radius r of the tracks, while the speed f of record/reproduction of information is maintained constant.

In an optical disk driving apparatus for playback-only applications, such as a compact disk (CD) player or the like, the rotation speed of an optical disk is automatically changed by controlling the driving force of an electric drive motor for rotating the optical disk, in order to obtain a reproduction signal at a constant speed.

On the other hand, in an optical disk driving apparatus adapted to perform both optical recording and/or reproduction of information for an optical disk, it is impossible to obtain a reproduction signal with a constant speed at or before the time of information is perfomred. Accordingly, generally, recording the latter system changes the rotation speed of the optical disk in steps with a relatively high resolution by using a signal output from an encoder secured to the drive motor, and the change in the rotation speed of the optical disk is regarded as a sufficiently continuous change.

In the CLV system, the recording of information is performed with a constant recording density b of information, and accordingly, it is possible to increase the recording capacity of the optical disk in comparison with that obtained by the CAV system. However, in the CLV system, it is necessary to change the rotation speed of the optical disk in accordance with the radius r of a track to be accessed for the recording and/or reproduction of information. This means that in order to effect quick access between the two tracks having significantly different radii with respect each other, it is necessary to produce a quick and significant change of the rotation speed of the optical disk. Accordingly, for the above-mentioned quick and significant change, it is necessary to use a drive motor having a large torque, causing the drive motor as well as the optical disk driving apparatus to be increased in size. For the above-mentioned accessing operation it is also necessary to supply a large amount of electric current to the drive motor, resulting in an increased electric power consumption.

On the other hand, as a method for maintaining a constant information recording density b on all the tracks of the optical disk while keeping a constant rotation speed n of the optical disk, it is possible to consider a construction in that the speed f of recording/reproduction of information is changed in proportion to the radius r of a track to be accessed, on the basis of a signal output from an encoder secured to the drive motor. However, in fact it is difficult to change the speed f of recording/reproduction of information with a necessary high resolution such that the change in the speed f of record/reproduction of information can be regarded as a sufficiently continuous change in comparison with the rotation speed n of the optical disk. Accordingly, it is difficult to realize the characteristics as described above, becuase the frequency of the information recording and/or reproduction signal is extremely high in comparison with that of the signal output from the encoder.

SUMMARY OF THE INVENTION

It is therefore an object of the present invention to provide a control system for an optical disk driving apparatus which makes it possible to increase the information recording capacity of an optical disk while enabling a drive motor for rotating the optical disk to be reduced in size in comparison with that used in conventional optical disk driving apparatus using the CLV system, thereby enabling a reduction of electric power consumption.

It is further object of the present invention to provide a control system for an optical disk driving apparatus, which enables the optical disk driving apparatus, with respect to the recording/reproduction of information, to use an optical disk interchangeable with an optical disk used in a driving apparatus using the CLV system.

The object of the invention can be achieved by a control system for an optical disk driving apparatus which is adapted to rotate an optical disk having a plurality of tracks, and which is adapted, during the rotation of the disk, to perform optical recording and/or reproduction of information for a track accessed by a light beam impinging thereon, the control system comprising:

means for changing the speed f of recording and/or reproduction of information in accordance with the radius r of a track to be accessed in such a manner that the tracks are divided into a plurality of concentric annular blocks defined by respective radii, and the same speed f of the record and/or reproduction of information is allocated to the tracks in the same block, and that different speeds f of record and/or reproduction of information are allocated to the respective blocks so as to change in proportion to the change of the radii defining the blocks; and means for changing the speed n of rotation of the optical disk in accordance with the radius r of the track to be accessed and the speed f of record and/or reproduction of information allocated to the block including the track to be accessed so that $f/(n \cdot r)$ is constant.

According to the present invention having the above-mentioned construction, the tracks on the optical disk are divided into a plurality of concentric annular blocks defined by respective radii. Different values of the speed f of record/reproduction of information are allocated to the respective blocks in such a manner that the speed f of record/reproduction of information changes in steps in proportion to the radii defining the blocks, and that the same value of the speed f of record/reproduction of information is allocated to the tracks in the same block.

On the other hand, the rotation speed n of the optical disk is controlled by the controller so that with respect to the speed f of recording/reproduction of information allocated to the block including the selected track having the radius r, the rotation speed n of the disk satisfies the condition that $f/(n \cdot r)$ is constant.

This means that it is only necessary to change the rotation speed n of the optical disk within a limited narrow region close to a fixed value. Accordingly, it is possible to provide a coarse adjustment with a low resolution on the speed f of record/reproduction of information in proportion to the change of the approximate radii of the blocks, and it is also possible to provide a fine adjustment with a high resolution on the rotation speed n of the optical disk within a limited narrow region around a fixed value so as to obtain a constant recording density of information on the optical disk.

Accordingly, the need to change the rotation speed of the drive motor during the accessing operation, can be reduced in comparison with a conventional optical disk driving apparatus using the CLV system.

Further, since the information recording density is maintained constant on every track of the optical disk, due to the above-mentioned control for the speed f of recording/reproduction of information and the rotation speed n of the optical disk, it is possible to provide the optical disk with substantially the same recording capacity of information as that obtained by the optical disk driving apparatus using the CLV system.

Accordingly, the present invention makes it possible to increase the recording capacity of an optical disk with a small-sized drive motor for rotating the optical disk in comparison with that used in conventional optical disk driving apparatus using the CLV system, thereby enabling a reduction in electric power consumption.

Further, it is also possible, according to the present invention, to use an optical disk having a recording format which is the same as that applied to an optical disk driving apparatus using CLV system. Therefore, with respect to the recording/reproduction of information, the optical disk driving apparatus provided with the control system according to the present invention can use interchangeable optical disks with an optical disk driving apparatus using the CLV system.

Further objects, features and advantages of the present invention will become apparent from the following description of the preferred embodiments of the present invention as illustrated in the accompanying drawings.

DESCRIPTION OF THE PREFERRED EMBODIMENTS

Figure 1:
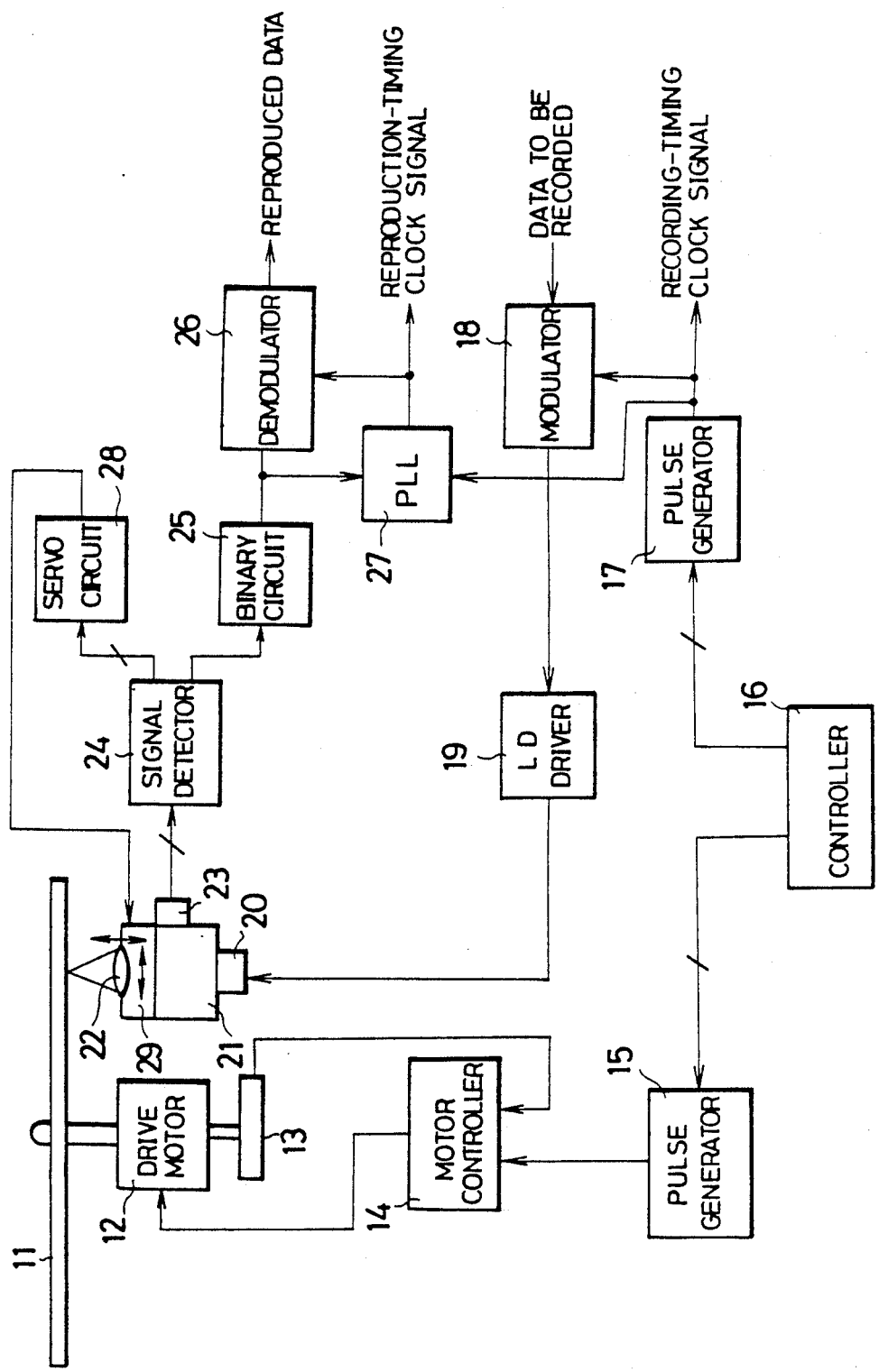
FIG. 1 is a block diagram illustrating a optical disk driving apparatus provided with a control system according to a preferred embodiment of the present invention.

Referring now to FIG. 1, there is schematically shown a construction of an optical disk driving apparatus according to a preferred embodiment of the present invention, in which an optical disk 11 has a plurality of concentric circular recording tracks. Alternatively, a plurality of recording tracks may be formed on the optical disk in the form of a continuous spiral.

The optical disk 11 is connected to and driven by a drive motor 12 for rotation about the center thereof. Also connected to the drive motor 12 opposite to the optical disk 11 is a rotary encoder 13 which generates a clock signal in accordance with the rotation of the drive motor 12.

A motor controller 14 is provided to control an electric drive current to be supplied to the motor 12 so as to cause the clock signal output from the encoder 13 to be equalized in frequency with that of a clock signal generated by a pulse generator 15.

Figure 2:
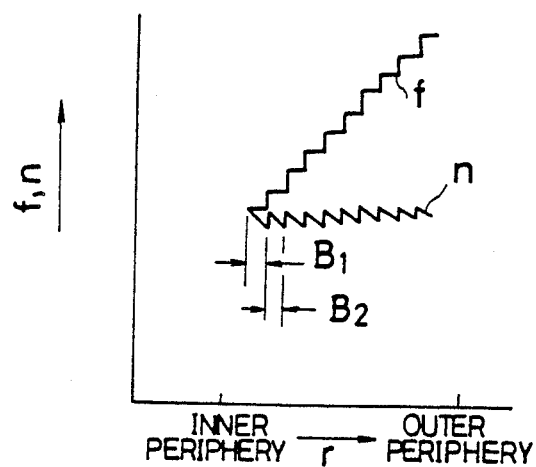
FIG. 2 is a graph for explaining a relationship between the radius of a track of the optical disk, the speed of recording/reproduction of information, and the rotation speed of the optical disk, in the optical disk driving apparatus shown in FIG. 1.

The pulse generator 15 is controlled by a controller 16 in such a manner that the clock signal to be output from the pulse generator 15 is changed in accordance with a set data applied thereto from the controller 16. Namely, the controller 16 is capable of changing the frequency of the clock signal to be output from the pulse generator 15 in accordance with the radius r of the track of the optical disk 11 at a recording and/or reproducing position thereon, thereby changing the rotation speed n (i.e., the number of revolutions per unit time) of the drive motor 12, as shown in FIG. 2.

Another pulse generator 17 is provided which can generate a clock signal for indicating the speed of recording/reproduction of information. The pulse generator 17 is controlled by a controller 16 in such a manner that the clock signal to be output from the pulse generator 17 is changed in accordance with a set data applied thereto from the controller 16. Namely, the controller 16 is capable of changing the frequency of the clock signal to be output from the pulse generator 17 in accordance with the radius r of a track to be accessed, thereby changing the speed f of record/reproduction of information, as shown in FIG. 2

In the case where the recording of optical information is performed, the data to be recorded is sent from the data source (not shown) synchronized with the clock signal from the pulse generator 17, to a modulator 18 in which the synchronized data is modulated by, for example, a method of modified frequency modulation (MFM). The modulated output signal from the modulator 18 is supplied to a laser diode (LD) driver 19 for driving a laser diode (LD) 20, so that the intensity of a light beam to be emitted from the laser diode (LD) 20 is changed with the output signal from the modulator 18.

The LD 20 is secured to an optical pickup 21 which is provided with an optical system including an object lens 22. The light beam emitted from the LD 20 is directed to the selected track of the optical disk 11 through the optical system including the object lens 22, by which information is recorded on the selected track of the optical disk 11.

On the other hand, in the case where the reproduction of information is performed, the LD driver 19, which is not supplied with the data to be recorded, causes the LD 20 to emit a light beam with a fixed intensity which is predetermined for the reproduction of information. The light beam emitted from the LD 20 is directed to the track of the optical disk 11 through the optical system including the object lens 22 and is reflected by the optical disk 11.

The reflected light beam passes though the optical system including the object lens 22, and is detected by a photodetector 23. The detected light is then converted by a signal detector 24 to an electric signal. The electric signal is then converted by a binary circuit 25 to a binary signal which is then demodulated by a demodulator 26, thereby being converted to reproduced data.

A phase locked loop (PLL) circuit 27 is provided for generating a reproduction-timing clock signal. More specifically, the PLL circuit 27 is operated so as to be synchronized with the clock signal output from the pulse generator 17, thereby generating a reproduction-timing clock signal which is so predetermined as to correspond to a standard reproduction speed, until the reproduction of information is started. During the information reproducing operation, the PLL circuit 27 is operated so as to be synchronized with the clock signal output from the binary circuit 25, thereby generating a reproduction-timing clock signal which changes with fluctuations in the information reproduction speed due to irregular rotation of the drive motor 12 or the like.

Similarly to a conventional configuration, the photodetector 23 is divided into a plurality of sections, each of which is adapted to produce a light-detecting signal.

In addition to the above-mentioned detection of recorded data encoded in the light reflected from the optical disk, the signal detector 24 is also adapted to detect errors in focus of the light beam spot on the track of the optical disk 11 (focusing error), and errors in position of the light beam spot on the track of the optical disk 11 (tracking error), by an appropriate calculation from the signals output from the photodetector sections. The signal detector 24 produces servo signals corresponding to the amount of detected focusing error and to the amount of detected tracking error, respectively. The above-mentioned light beam spot is produced by the object lens 22 which is able to converge the light beam emitted from the LD 20.

A servo circuit 28 is provided for controlling a drive current to be supplied to an actuator 29 adapted to drive the object lens 22, in accordance with the servo signals output from the signal detector 24, so that the light beam spot is always accurately in focus on the aimed track on the optical disk 11.

Similarly to a conventional configuration, a seek mechanism (not shown) is provided for accessing the optical pickup 21 to a desired track on the optical disk 11 by moving the optical pickup 21 in the radius direction of the optical disk 11.

FIG. 2 shows relationships between the radius r of the track of the optical disk 11, the information recording and/or reproduction speed f, and the rotation speed n (i.e., the number of revolutions per unit time) of the optical disk 11, which is obtained by the operation of the controller 16 shown in FIG. 1.

Figure 3:
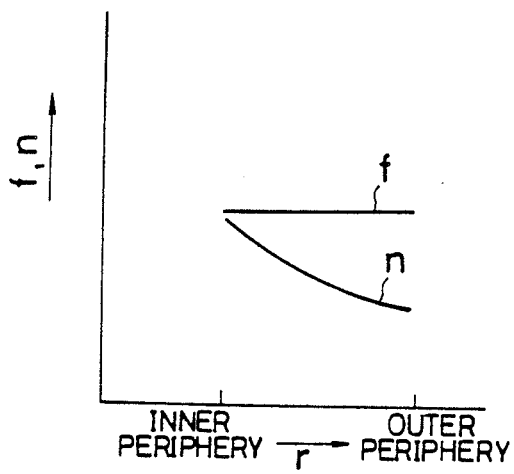
FIG. 3 is a graph for explaining a relationship between the radius of a track of the optical disk, the speed of recording/reproduction, and the rotation speed of the optical disk, in a conventional optical disk driving apparatus using a CLV system.
Figure 4:
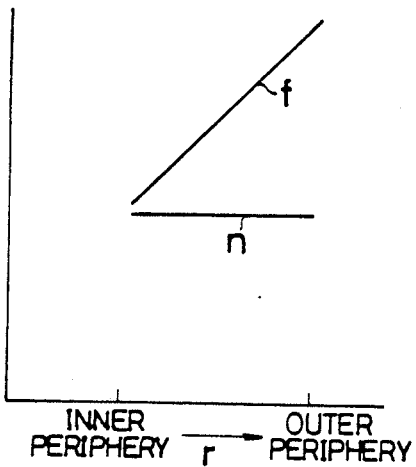
FIG. 4 is a graph for explaining a relationship between the radius of a track of the optical disk, the speed of recording/reproduction of information, and the rotation speed of the optical disk, in an optical disk driving apparatus maintaining a constant information recording density while keeping a constant rotation speed of the optical disk.

Comparing with FIG. 2, similar relationships between the radius r, the information recording and/or reproduction speed f, and the rotation speed n in a CLV system and in the optical disk driving system maintaining a constant information recording density while keeping a constant rotation speed of the optical disk are shown in FIG. 3 and in FIG. 4 respectively. In FIG. 3, it shows that the change of rotation speed n of the optical disk is inversely proportional to the radius r of the tracks, while the speed f of recording and/or reproduction is kept constant. In FIG. 4, it shows that the change of speed f of recording and/or reproduction is proportional to the radius r of the track to be accessed, while the rotation speed n of the optical disk is kept at a constant.

In this embodiment as shown in FIG. 2, the recording surface of the optical disk 11 is divied into a plurality of concentric annular blocks B1, B2 . . . defined by respective radii. Different speeds f of record/reproduction of information are allocated to the blocks B1, B2 . . . , respectively, in such a manner that the speed f of record/reproduction of information changes in proportion to the radii defining the blocks, and that the same speed f of record/reproduction of information is allocated to the tracks existing in the same block.

On the other hand, the rotation speed n of the optical disk 11 is controlled by the controller 16 so that the information recording density b of the optical disk 11, i.e., the value obtained by above-mentioned equation (1), is maintained constant. This means that is is only necessary to change the rotation speed n of the optical disk 11 within a limited narrow region around a fixed value, as shown in FIG. 2.

Accordingly, in this embodiment, it is possible to provide a coarse adjustment with a low resolution on the speed of record/reproduction of information, which is generally difficult to change with a high resolution, in proportion to the change of the radii defining the blocks, and it is also possible to provide a fine adjustment with a high resolution on the rotation speed n of the optical disk, which is generally easy to change with a high resolution, within a limited narrow region around a fixed value so as to provide a substantially constant information recording density b on all the tracks of the optical disk 11.

As the result, the need to change the of rotation speed of the drive motor 12 during the accessing operation can be reduced in comparison with a conventional optical disk driving apparatus using the CLV system, enabling the drive motor 12 to be decreased in size and thus resulting in a reduction in an electric power consumption.

Further, similarly to an optical disk driving apparatus using the CLV system, the information recording density is maintained at a fixed value on every track on the optical disk 11. Accordingly, it is possible to use an optical disk having the same recording capacity as that obtained by the optical disk driving apparatus using the CLV system. Further, a recording format which is the same as that applied to an optical disk driving apparatus using CLV system, can be applied to the optical disk 11 which is to be used for the optical disk driving apparatus shown in FIG. 1. Namely, with respect to the recording/reproduction of information, the optical disk driving apparatus having a control system according to this embodiment has can use optical disks interchangeable with the optical disks used in an optical disk driving apparatus using the CLV system.

Figure 5:
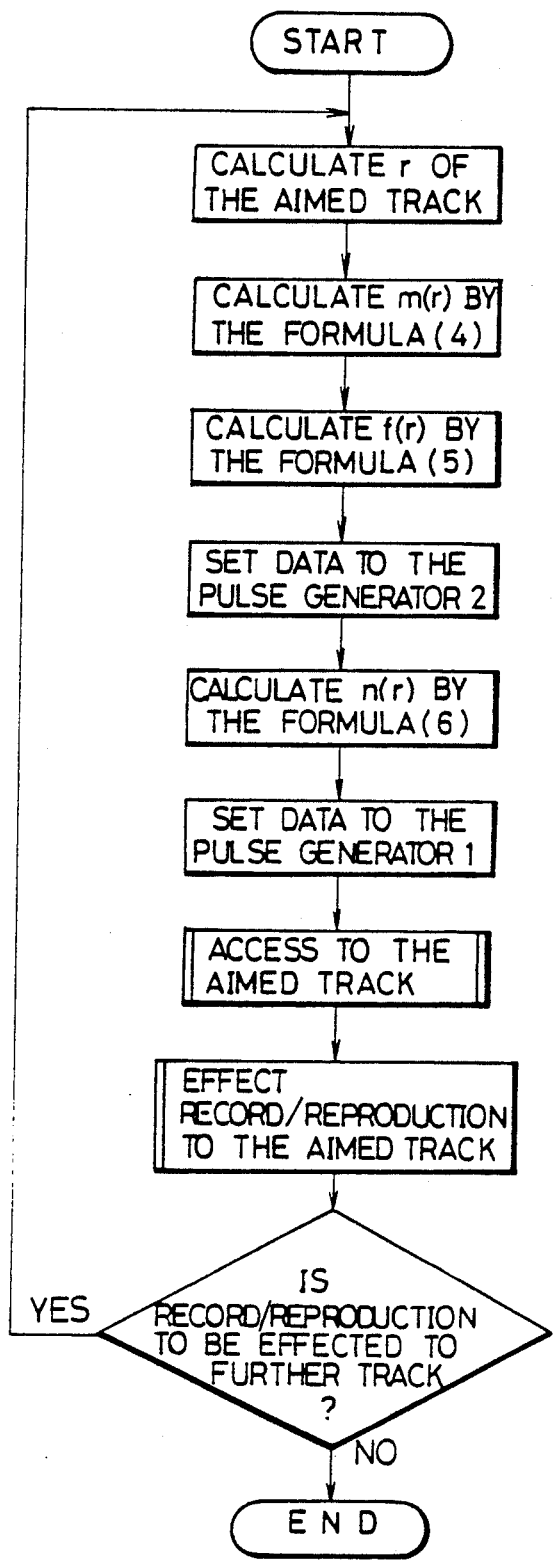
FIG. 5 is a flow chart for explaining the operation of the control system in the optical disk driving apparatus shown in FIG. 1.

FIG. 5 is a flow chart for explaining the operation of the controller 16 which is adapted to obtain the relationship between the speed of recording/reproduction of information and the rotation speed n of the optical disk 11, shown in FIG. 2.

In this embodiment, for the sake of clarity of description, it is decided that the width $\Delta r$ (mm) of each of the blocks in the radial direction of the optical disk is given as a quotient obtained by dividing the radius $r_0$ (mm) of the innermost track of the optical disk by an appropriate positive integer. Namely, the width $\Delta r$ (mm) is obtained by the following equation.

$$\Delta r = r_0 / m_0 \quad (2)$$

($m_0$: integer)

Similarly, when the speed of record/reproduction of information on the innermost track of the optical disk is represented as $f_0$ (bit/sec), the increment $\Delta f$ (bit/sec) of the speed f of record/reproduction of information is obtained by the following equation.

$$\Delta f = f_0 / m_0 \quad (3)$$

As shown in FIG. 5, after the radius r (mm) of a target track which is to be accessed for the recording/reproduction of information is calculated on the basis of an access data(not shown), the integer m(r) is calculated from the following equation.

$$m(r) = int(r / \Delta r) \quad (4)$$

Here, a function int(x) of a given real number x gives a maximum integer which is less than the real number x. Namely, according to this function int(x), the maximum integer is obtained by omitting figures below the decimal point from the real number. Accordingly, an integer m(r) obtained by the equation (4) indicates a block to which the track to be recorded on or reproduced from belongs.

Next, the speed of recording/reproduction of information f(r) on that block is calculated by the following equation.

$$f(r) = m(r) \cdot \Delta f \quad (5)$$

Then, the set data to be sent from the controller 16 to the pulse generator 17 (i.e., the pulse generator 2 in FIG. 5) is adjusted so as to become equal to the calculated speed f(r).

Next, a disk rotation speed n(r) for obtaining a constant recording density b of information is calculated by the following equation.

$$n(r) = f(r) / (2\pi \cdot b \cdot r) \quad (6)$$

Then, the set data to be sent from the controller 16 to the pulse generator 15 (i.e., the pulse generator 1 in FIG. 5) is adjusted so as to become equal to the calculated speed n(r).

Thereafter, the optical pickup 21 is moved to the target track, and information recording and/or reproduction is performed by the optical information recording and/or reproducing system at the target track on the optical disk 11.

In this way, by executing repeatedly the process shown in FIG. 5, the relationship between f, n, and r, as shown in FIG. 2, is maintained, and accordingly, a constant recording density b is obtained on the tracks of the optical disk.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for controlling an information recording and/or reproduction speed "f" and a rotation speed "n" of an optical disk used in an information recording and/or reproduction device, said optical disk having a plurality of tracks in the form of concentric circles or a spiral, said information recording and/or reproduction device being adapted to access said tracks by means of a light beam while rotating said optical disk, thereby to optically record information on or reproduce information from said tracks, said method comprising the steps of:

dividing said tracks into a plurality of concentric annular blocks which are different in radius from each other;

changing said information recording and/or reproduction speed "f" in accordance with the radius of a track to be accessed in such a manner that said recording and/or reproduction speed "f" is constant within a block but different as between said blocks depending on the block radii; and changing said rotation speed "n" of said optical disk in such a manner that $f/(n \cdot r)$ is constant, where "r" is the radius of said track to be accessed.

2. A method according to claim 1, wherein the widths "$\Delta r$" of adjacent blocks are identical with each other with respect to a radial direction of said disk.

3. A method according to claim 2, wherein the width "$\Delta r$" of a block in the radial direction is determined in accordance with:

$$\Delta r = r_0/m_0$$

where "$r_0$" is the radius of the innermost track of the disk and "$m_0$" is a predetermined integer.

4. A method according to claim 3, wherein said step of changing said speed "f" comprises changing said speed "f" in steps with a constant increment $\Delta f$ which is determined in accordance with:

$$\Delta f = f_0/m_0$$

where "$f_0$" is an information recording and/or reproduction speed allocated to the innermost track of the disk.

5. A method according to claim 4, wherein said speed "f" to be allocated to a block including the track to be accessed is determined in accordance with:

$$f = m(r) \cdot \Delta f$$

where "$m(r)$" represents a maximum integer less than said radius "r" of said track to be accessed and is determined in accordance with:

$$m(r) = int(r/\Delta r).$$

6. A method according to claim 5, wherein said speed "n" is determined to satisfy the following condition with respect to said radius "r" of said track to be accessed and said speed "f" allocated to the block including said track to be accessed:

$$n = f/(2\pi \cdot b \cdot r)$$

where "b" represents a desired information recording density.

7. A method according to claim 1, wherein said tracks are concentrically arranged on said disk about the center of said disk.

8. A method according to claim 1, wherein said tracks are substantially concentrically arranged on said disk in the form of a continuous spiral.

9. An apparatus for controlling an information recording and/or reproduction speed "f" and a rotation speed "n" of an optical disk used in an information recording and/or reproduction device, said optical disk having a plurality of tracks in the form of concentric circles or a spiral, said information recording and/or reproduction device being adapted to access said tracks by means of a light beam while rotating said optical disk, thereby to perform an optical recording and/or reproduction with respect to said tracks, said apparatus comprising:

a dividing means for dividing said tracks into a plurality of concentric annular blocks which are different in radius from each other;

a first changing means for changing said information recording and/or reproduction speed "f" in accordance with a radius of said track in such a manner that said speed "f" is constant within a block but is different as between different blocks and depends on the radii of the blocks; and a second changing means for changing said rotation speed "n" of said optical disk in such a manner that $f/(n \cdot r)$ is constant, where "r" is the radius of said track to be accessed.

10. An apparatus according to claim 9, wherein the widths "$\Delta r$" of adjacent blocks are identical with each other with respect to a radial direction of said disk.

11. An apparatus according to claim 10, wherein said width "$\Delta r$" is determined in accordance with:

$$\Delta r = r_0/m_0$$

where "$r_0$" is the radius of the innermost tracks on the disk and "$m_0$" is a predetermined integer.

12. An apparatus according to claim 11, wherein said first changing means comprises a means for changing said speed "f" in steps with a constant increment "$\Delta f$" which is determined in accordance with:

$$\Delta f = f_0/m_0$$

where "$f_0$" is an information recording and/or reproduction speed allocated to the innermost track on the disk.

13. An apparatus according to claim 12, wherein said speed "f" to be allocated to the block including said track to be accessed is determined in accordance with: ti $f = m(r) \cdot \Delta f$ where "$m(r)$" represents a maximum integer less than said radius "r" of said track to be accessed and is determined in accordance with:

$$m(r) = int(r/\Delta r).$$

14. An apparatus according to claim 13, wherein said speed "n" is determined to satisfy the condition with respect to said radius "r" of said track to be accessed and said speed "f" allocated to the block including said track to be accessed:

$$n = f/(2\pi \cdot b \cdot r)$$

where "b" represents a desired information recording density.

15. An apparatus according to claim 14, wherein said tracks are concentrically arranged on said disk about the center of said disk.

16. An apparatus according to claim 9, wherein said tracks are substantially concentrically arranged on said disk in the form of a continuous spiral.

* * * * *

UNITED STATES PATENT AND TRADEMARK OFFICE
CERTIFICATE OF CORRECTION

PATENT NO. : 5,063,552
DATED : November 5, 1991
INVENTOR(S) : Toshihiro Shigemori It is certified that error appears in the above-identified patent and that said Letters Patent is hereby corrected as shown below:

Column 10, line 39, (Claim 13), delete "ti"; and

Column 10, line 56, (Claim 15), change "claim 14" to --claim 9--.

Signed and Sealed this

Thirteenth Day of July, 1993

*Attest:*

MICHAEL K. KIRK

*Attesting Officer*   Acting Commissioner of Patents and Trademarks